United States Patent
Oda et al.

(10) Patent No.: US 7,193,650 B2
(45) Date of Patent: Mar. 20, 2007

(54) IMAGE SENSING APPARATUS

(75) Inventors: Kazuya Oda, Asaka (JP); Atsuhiko Ishihara, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 959 days.

(21) Appl. No.: 10/298,795

(22) Filed: Nov. 19, 2002

(65) Prior Publication Data
US 2003/0095299 A1 May 22, 2003

(30) Foreign Application Priority Data
Nov. 20, 2001 (JP) ............................ 2001-354202

(51) Int. Cl.
*H04N 9/64* (2006.01)
*H04N 5/238* (2006.01)
(52) U.S. Cl. ...................................... 348/248; 348/364
(58) Field of Classification Search ............... 348/241, 348/248, 249, 296, 362–364
See application file for complete search history.

(56) References Cited
U.S. PATENT DOCUMENTS
4,556,911 A * 12/1985 Imaide et al. ............... 348/297
4,578,707 A * 3/1986 Ozawa et al. ............... 348/248
5,140,426 A * 8/1992 Oda ............................. 348/249
5,517,243 A * 5/1996 Kudo et al. ................. 348/296
6,667,770 B1 * 12/2003 Higuchi et al. ............. 348/362
6,888,570 B1 * 5/2005 Yoshida ...................... 348/296
2002/0186313 A1 * 12/2002 Kidono et al. .............. 348/362

FOREIGN PATENT DOCUMENTS
JP 60-123174 A 7/1985
JP 2-117278 A 5/1990
JP 3-167534 A 7/1991

* cited by examiner

Primary Examiner—Vivek Srivastava
Assistant Examiner—Timothy J. Henn
(74) Attorney, Agent, or Firm—Birch, Stewart, Kolasch & Birch, LLP

(57) ABSTRACT

The level of smear charge stored in a CCD is calculated. If the smear level is equal to or greater than a predetermined threshold value, exposure is performed using a mechanical shutter in order to suppress smear. If the smear level is less than the threshold value, exposure is controlled utilizing an electronic shutter. Power consumption owing to drive of the mechanical shutter can be reduced while occurrence of smear is suppressed.

1 Claim, 3 Drawing Sheets

IMAGE SENSING APPARATUS

BACKGROUND OF THE INVENTION

1. Field of the Invention

This invention relates to an image sensing apparatus (inclusive of a digital still camera, a digital movie camera and a personal digital assistant having a camera function).

2. Description of the Related Art

In a digital still camera that uses a solid-state image sensing device such as a CCD, a shutter operation can be performed, without providing a mechanical shutter, by controlling sweep-out of unnecessary signal charge, which has been stored in the solid-state image sensing device, and read-out of signal charge. This is a so-called electronic shutter operation.

If the aperture of a photodiode is widened in order to improve the sensitivity of a solid-state image sensing device, this leads to storage of a large quantity of smear signal charge, which causes the occurrence of smear. (Signal charge that causes smearing shall be referred to as "smear signal charge".) Further, if the number of pixels of the solid-state image sensing device is increased, the time needed to read signal charge out of the solid-state image sensing device lengthens, as a consequence of which even more smear signal charge accumulates in the device. For these reasons, some digital still cameras having an electronic shutter capability are provided with a mechanical shutter as well.

When exposure time of a solid-state image sensing device is controlled using a mechanical shutter, however, the following problems arise: First, since operating time such as that for opening and closing the mechanical shutter is required, the intervals at which successive frames can be shot continuously cannot be made as short as in the case of the electronic shutter. Second, since a mechanical shutter is operated, durability declines and more power is consumed.

SUMMARY OF THE INVENTION

Accordingly, an object of the present invention is to solve the aforementioned problems of an image sensing apparatus having a mechanical shutter.

According to the present invention, the foregoing object is attained by providing an image sensing apparatus having a solid-state image sensing device for storing signal charge conforming to amount of received light with which a photoreceptor surface is irradiated, reading out the signal charge stored and outputting a video signal (inclusive of image data), comprising: a drive device for controlling read-out of signal charge, which has been stored in the solid-state image sensing device, and sweep-out of unnecessary signal charge; a mechanical shutter for limiting irradiation time during which the photoreceptor surface of the solid-state image sensing device is irradiated with light; a decision device for deciding whether to perform a mechanical shutter operation by the mechanical shutter or an electronic shutter operation by the drive device based upon amount of smear signal charge that has been stored in the solid-state image sensing device; and a shutter control device for controlling at least one of the drive device and mechanical shutter, in accordance with the decision rendered by the decision device, so as to perform at least one of the electronic shutter operation and mechanical shutter operation.

The present invention provides also an operation control method suited to the image sensing apparatus described above. Specifically, the invention provides a method of controlling operation of an image sensing apparatus having a solid-state image sensing device for storing signal charge conforming to amount of received light with which a photoreceptor surface is irradiated, reading out the signal charge stored and outputting a video signal, the method comprising the steps of: providing a drive device, which is for controlling read-out of signal charge stored in the solid-state image sensing device and sweep-out of unnecessary signal charge, and a mechanical shutter, which is for limiting irradiation time during which the photoreceptor surface of the solid-state image sensing device is irradiated with light; deciding whether to perform a mechanical shutter operation by the mechanical shutter or an electronic shutter operation by the drive device based upon amount of smear signal charge that has been stored in the solid-state image sensing device; and controlling at least one of the drive device and mechanical shutter, in accordance with the decision rendered, so as to perform at least one of the electronic shutter operation and mechanical shutter operation.

In accordance with the present invention, whether a mechanical shutter operation of an electronic shutter operation is to be performed is decided in accordance with amount of smear signal charge (i.e., an output signal from device (means) for detecting amount of smear signal charge). If the amount of smear signal charge is small, the electronic shutter is operated because the smear phenomenon (the occurrence of bright spots in an image owing to smear signal charge) will be inconspicuous. If the amount of smear signal charge is large, however, the mechanical shutter is operated because the smear phenomenon will be conspicuous.

In accordance with the present invention, the mechanical shutter is not operated if the smear phenomenon is inconspicuous. This makes it possible to shorten the continuous-photography interval. Further, a decline in durability and an increase in power consumption can be prevented. If the smear phenomenon is conspicuous, the mechanical shutter is operated. As a result, the smear phenomenon can be suppressed by cutting off light to the solid-state image sensing device and sweeping out smear signal charge.

The image sensing apparatus may further be provided with an iris for limiting amount of light that irradiates the photoreceptor surface of the solid-state image sensing device, and a calculation device for calculating f-stop and shutter speed of the iris. In this case the decision device can execute the decision processing upon regarding the f-stop and/or shutter speed, which has been calculated by the calculation device, as the amount of smear signal charge.

The image sensing apparatus may further be provided with a device for controlling the shutter control device and the drive device, in response to a decision rendered by the decision device that the electronic shutter operation is to be performed, in such a manner that irradiation time during which the photoreceptor surface of the solid-state image sensing device is irradiated with light due to the electronic shutter operation and time for read-out of a video signal from the solid-state image sensing device overlap.

Since the light irradiation time (exposure time) and video-signal read-out time overlap, the time interval between exposures can be shortened. This makes it possible to shorten the continuous-photography interval in the continuous-shot photography mode.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

A preferred embodiment of an image sensing apparatus according to the present invention will now be described with reference to the drawings.

Figure 1:
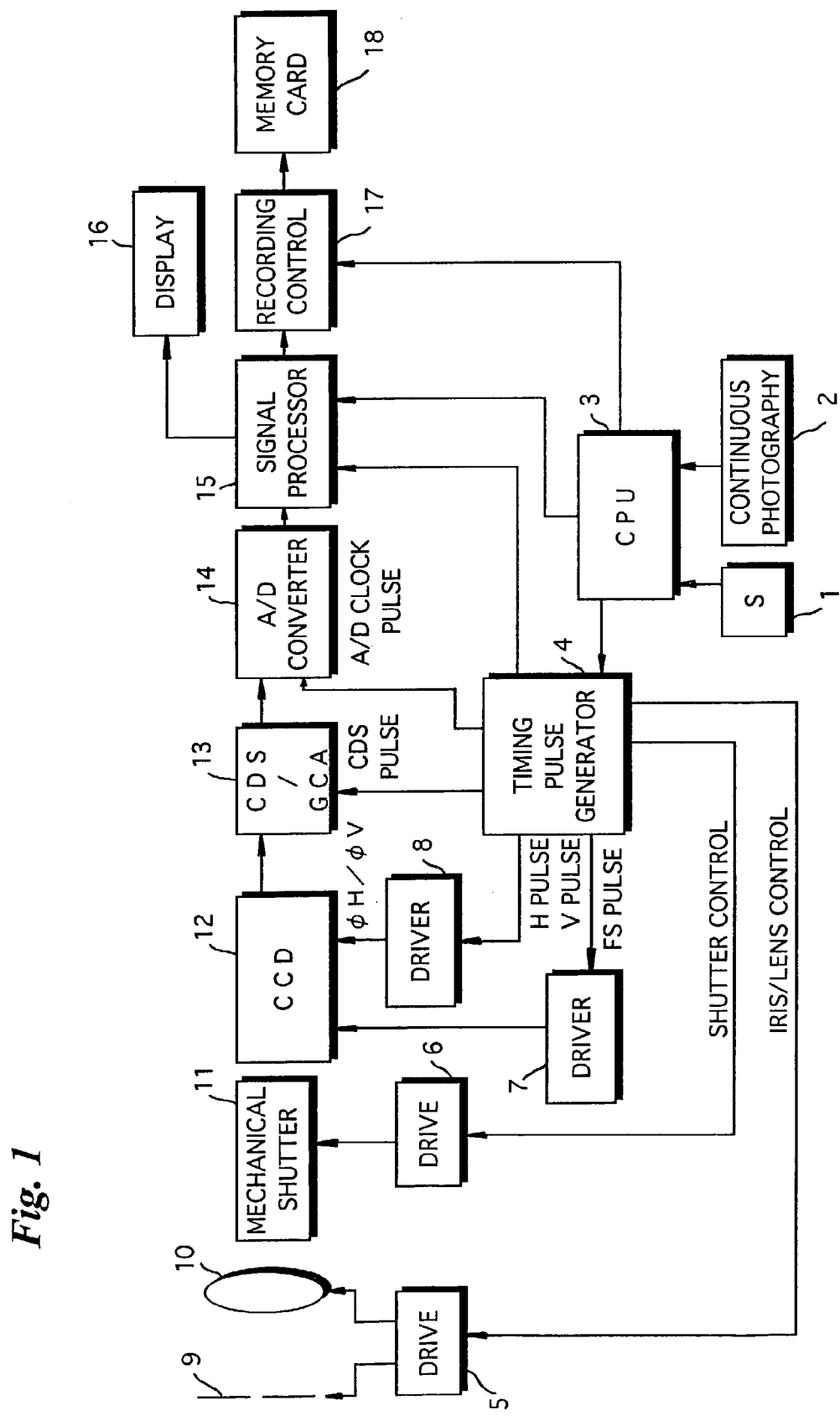
FIG. 1 is a block diagram illustrating the electrical structure of a digital still camera according to the present invention.

FIG. 1 is a block diagram showing the electrical structure of a digital still camera illustrating a preferred embodiment of the present invention.

The overall operation of the digital still camera is controlled by a CPU 3.

The digital still camera is provided with a shutter-release button 1, which is of the type capable of being pressed through first and second stroke lengths. Automatic exposure control and automatic focus control, etc., is carried out based upon pressing of the shutter-release button 1 through its first stroke length, an image sensing for recording purposes is performed based upon pressing of the shutter-release button 1 through its second stroke length. The signals indicative of pressing of the shutter-release button 1 through its first and second stroke lengths are input to the CPU 3. The digital still camera is further provided with various switches, such as a continuous-shot photography mode switch 2. Output signals from the switches such as the continuous-shot photography mode switch 2 also are input to the CPU 3.

The digital still camera is further provided with a timing pulse generating circuit 4 for outputting various timing pulses.

The digital still camera is provided with an iris 9 for limiting the amount of light supplied to a CCD 12, and a zoom lens 10 for forming the image of a subject on a photoreceptor surface of the CCD 12. The degree to which the iris 9 is opened and the positioning of the zoom lens 10 are controlled by a drive circuit 5. The digital still camera is provided with a mechanical shutter 11 driven by a drive circuit 6.

The CCD 12 senses the image of a subject and outputs a video signal that represents the image of the subject. The CCD 12, which possesses an electronic shutter function, has its exposure time limited based upon a field-shift pulse (FS pulse) provided by a driver 7. The latter applies vertical transfer pulses ΦV and horizontal transfer pulses ΦH to vertical and horizontal transfer lines (not shown), respectively, constructing the CCD 12. Signal charge that has been stored in the CCD 12 is output as a video signal in accordance with the vertical transfer pulses ΦV and horizontal transfer pulses ΦH.

This embodiment is such that the mechanical shutter 11 is utilized when smear signal charge stored in the CCD 12 is judged to be large, and the electronic shutter is utilized when smear signal charge stored in the CCD 12 is judged to be small.

The video signal output from the CCD 12 is subjected to processing for correlated double sampling and amplification in a CDS/GCA (correlated double sampling/gain-controlled amplification) 13. The video signal that is output from the CDS/GCA circuit 13 is converted to digital image data in an analog/digital converter circuit 14. The image data obtained by the conversion is subjected to predetermined signal processing such as a color balance adjustment and gamma correction in a signal processing circuit 15.

The digital image data output from the signal processing circuit 15 is applied to a display unit 16 having a display screen on which the image of the subject is displayed.

If the shutter-release button 1 is pressed through the first part of its stroke, the image data that has been output from the analog/digital converter circuit 14 as described above is input to the CPU 3 via the signal processing circuit 15. The CPU 3 calculates a photometric value based upon the input image data. The f-stop and shutter speed are decided based upon the calculated photometric value. The iris 9 is controlled by the drive circuit 5 so as to obtain the decided f-stop. Further, the mechanical shutter 11 is controlled by the drive circuit 6, or the electronic shutter that relies upon the CCD 12 is controlled, so as to obtain the shutter speed decided. Similarly, the zoom lens 10 is positioned by the drive circuit 5.

Further, when the shutter-release button 1 is pressed through the first part of its stroke, the amount of smear charge that will accumulate in the CCD 12 also is calculated. The amount of smear can be calculated based upon signal charge obtained from an optical black area at the periphery of an effective pixel are of the CCD 12. Of course, the shutter speed or f-stop that has been decided can also be regarded as an indication of amount of smear. Since it is considered that the higher the shutter speed decided, the brighter the environment in which image sensing will be carried out, the amount of smear is construed to be large in such case. Further, it is considered that since the larger the opening of the iris 9, the larger the component of light that will enter the shielded area of the CCD 12, the amount of smear will also be large.

For example, in case of single-shot photography, it is considered that the amount of smear will be large if the shutter speed is equal to or greater than $\frac{1}{500}$ s. Hence, use is made of the mechanical shutter 11. If the shutter speed is less than $\frac{1}{500}$ s, it is considered that the amount of smear will be small and, hence, the electronic shutter is utilized. In case of continuous-shot photography, the mechanical shutter 11 and electronic shutter are switched between in accordance with whether or not the shutter speed is equal to or greater than $\frac{1}{1000}$ s. Furthermore, if the iris 9 is of the two-stage type having f-stops of F4 and F8, then, by way of example, the mechanical shutter 11 is used in case of F4 and the electronic shutter is used in case of F8.

If the shutter-release button 1 is pressed through the second part of its stroke, the image of the subject is sensed at this timing and a video signal representing the image of the subject is output from the CCD 12. The video signal is input to the signal processing circuit 15 via the CDS/GCA circuit 13 and analog/digital converter circuit 14 as described above. In addition to executing the above-mentioned signal processing, such as a color balance adjustment and gamma correction, the signal processing circuit 15 executes processing for generating luminance data and color difference data and processing for compressing data. The compressed image data is applied to a recording control circuit 17 and recorded on a memory card 18.

It goes without saying that when the continuous-shot photography mode has been set by the continuous-shot photography mode switch 2, the above-described recording processing is repeated for a number of successive frames (or for as long as the shutter-release button 1 is being pressed).

Figure 2:
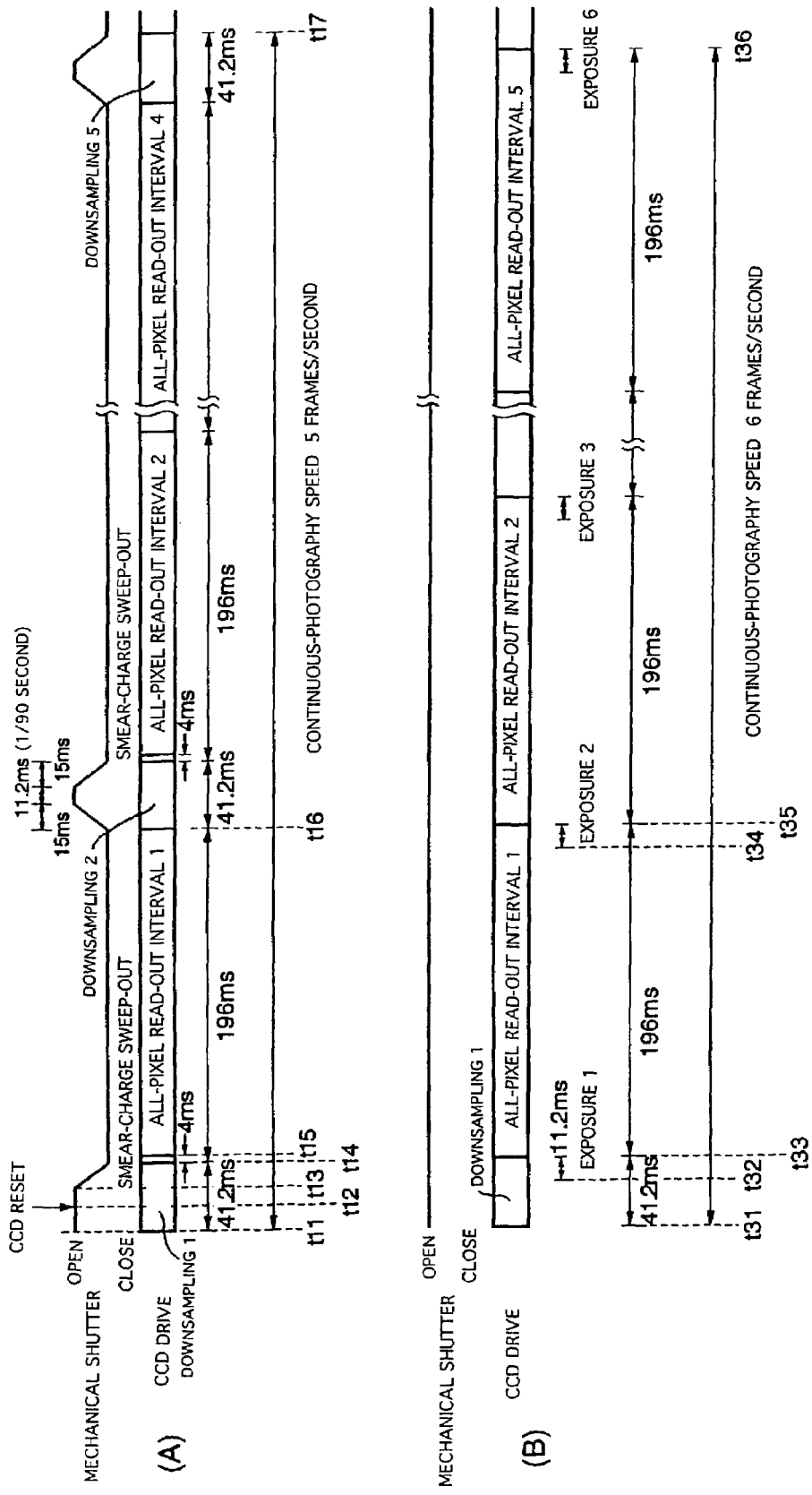
FIGS. 2A and 2B are time charts illustrating the operation of the digital still camera.

FIGS. 2A and 2B are time charts illustrating operation of the digital still camera when the continuous-shot photography mode has been set. FIG. 2A illustrates a case where the mechanical shutter 11 operates, and FIG. 2B a case where the mechanical shutter 11 does not operate.

Continuous-shot photography starts when the continuous-shot photography mode is set by the continuous-shot photography mode switch 2 and, moreover, the shutter-release button 1 is pressed (through the second part of its stroke).

A case where the mechanical shutter 11 is used (the mechanical-shutter mode) will be described first with reference to FIG. 2A. In the mechanical-shutter mode, the CCD 12 is repeatedly driven for downsampling read-out, read-out of smear charge and read-out of all pixels.

If the shutter-release button 1 is pressed through the second part of its stroke at time t11, the CCD 12 operates in a downsampling read-out interval (about 41.2 ms). As a result of the downsampling read-out mode, signal charge that has been stored in the entirety of the effective pixel area of the CCD 12 is not read out of the CCD 12 (all pixels are not read out); rather, signal charge that has been stored in part of the effective pixel area is read out. The image represented by the video signal thus read out is displayed on the display screen of the display unit 16.

When the first frame of continuous-shot photography sequence is taken, the mechanical shutter 11 has already been released. At time t12, therefore, a field-shift pulse of the CCD 12 is applied and the signal charge that has been stored is swept out (the CCD 12 is reset). When time t13 arrives, exposure of the CCD 12 (exposure time: about 11.2 ms) ends (the period of time from t12 to t13 is the exposure time) and the mechanical shutter 11 closes. When time t14 arrives, the mechanical shutter 11 is closed fully (time until mechanical shutter 11 closes fully: about 15 ms).

When time t14 arrives and the mechanical shutter 11 closes fully, the smear-charge read-out interval (about 4 ms) is attained and the smear charge that has accumulated in the CCD 12 is swept out. Smear can be reduced because the CCD 12 can be shielded by the mechanical shutter 11 and the smear charge can be swept out during the shielded period.

When time t15 arrives and smear charge is swept out, a field-shift pulse is applied to the CCD 12 and the signal charge that accumulated during exposure time is shifted to the vertical transfer lines (not shown) of the CCD 12. An all-pixel read-out interval (about 196 ms) commences and signal charge that accumulated during exposure time is output from the CCD 12 as a video signal.

When time t16 arrives, the all-pixel read-out interval ends. Signal charge read-out in the all-pixel read-out interval is output as a video signal. The video signal is converted to image data and the data is recorded on the memory card 18, as set forth above.

A downsampling interval for the second frame begins at time t16. The mechanical shutter 11 starts being released from time t16. When the downsampling interval ends, the smear-charge read-out interval is attained and a transition is made to the all-pixel read-out interval.

At time t17, five frames of continuous photography, which lasted about 1 s, ends (continuous-shot photography speed: about 5 frames/s).

If it is decided that the mechanical shutter 11 is not to be used (the mechanical-shutter mode is off), the downsampling interval is attained with regard to the first frame of continuous-shot photography and then the all-pixel read-out interval is repeated, as shown in FIG. 2B.

If the shutter-release button 1 is pressed through the second part of its stroke at time t11 in FIG. 2B, the CCD 12 operates in the downsampling read-out interval. At time t31, a field-shift pulse is applied to the CCD 12, unnecessary charge that has been stored in the CCD 12 is swept out and exposure begins (exposure time: about 11.2 ms). When time t33 arrives, a field-shift pulse is applied to the CCD 12 again, signal charge that accumulated owing to exposure is shifted to the vertical transfer lines and exposure ends (by the electronic shutter).

The all-pixel read-out interval for the image of the first frame commences from time t33 and the signal charge that accumulated owing to exposure and that represents the first frame of the image is output as a video signal. A field-shift pulse is applied to the CCD 12 again at time t34 in the all-pixel read-out interval of the second frame, unnecessary charge is swept out and exposure for the image of the second frame begins. At time t35, a field-shift pulse is applied to the CCD 12 and exposure ends. The all-pixel read-out interval for the second frame starts and the signal charge that has been stored is output. Imaging is subsequently repeated in similar fashion.

If the mechanical shutter 11 is not to be used, the downsampling read-out interval is for the first frame only; downsampling read-out intervals do not occur from the second frame onward (smear-charge read-out intervals also do not occur). Accordingly, the image sensing period becomes the period of the all-pixel read-out interval and the speed of continuous-shot photography can be raised. In this embodiment, the speed of continuous-shot photography is approximately 6 frames/s.

When smear becomes conspicuous, the subject is imaged using the mechanical shutter 11 and, hence, smear can be diminished. When smear is not conspicuous, imaging is performed without using the mechanical shutter 11. As a result, it is possible to prevent an increase in power consumption ascribable to drive of the mechanical shutter 11.

In the above-described embodiment, the speed of continuous-shot photography when the mechanical shutter 11 is used differs from that when the mechanical shutter 11 is not used. However, it goes without saying that the speed of continuous-shot photography may be made the same in both cases.

Figure 3:
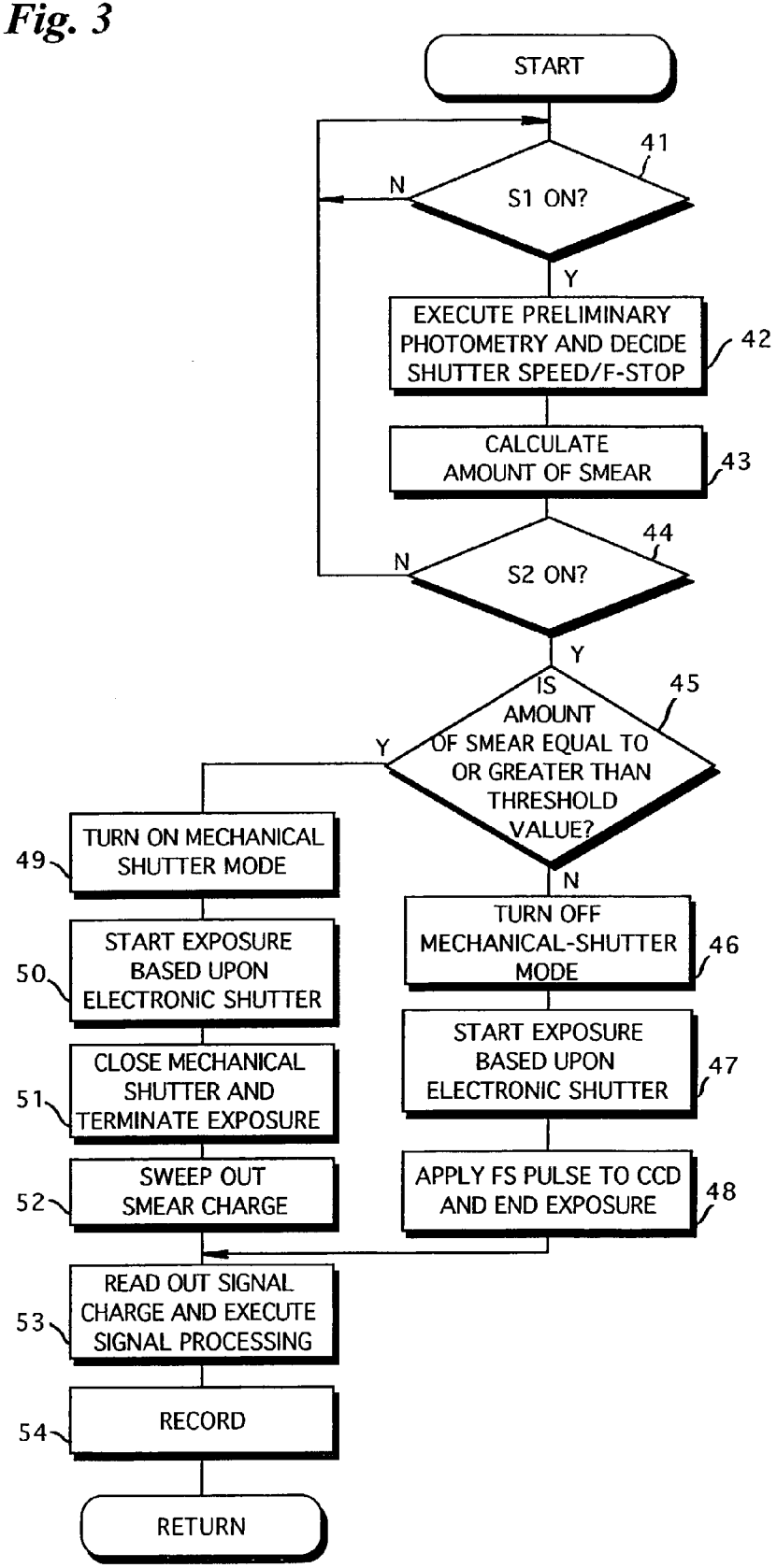
FIG. 3 is a flowchart illustrating the procedure of processing executed by the digital still camera.

FIG. 3 is a flowchart illustrating the processing at the time of single-shot photography.

Operation of the digital still camera according to this embodiment is applicable not only to continuous photography in the manner described above but also to single-shot photography.

If the shutter-release button 1 is pressed through the first part of its stroke ("YES" at step 41), preliminary photometry is carried out and shutter speed and f-stop are decided in the manner described above (step 42). The amount of smear is calculated based upon signal charge obtained from the optical black area (step 43).

If the shutter-release button 1 is pressed through the second part of its stroke ("YES" at step 44), it is determined whether the calculated amount of smear is equal to or greater than a predetermined threshold value (step 45).

If the amount of smear is less than the predetermined threshold value ("NO" at step 45), the mechanical-shutter mode is turned off (step 46: a predetermined flag indicative of the mechanical-shutter mode would be set to the OFF state) and the CCD 12 is exposed to light by the electronic shutter operation in the manner described on connection with continuous-shot photography (step 47). A field-shift pulse is applied to the CCD 12, whereby exposure is terminated (step 48).

Signal charge that has been stored in the CCD 12 is read out and the charge is output as a video signal. Predetermined signal processing is executed based upon the output video signal (step 53). The digital image data obtained by signal processing is recorded on the memory card 18 (step 54).

If the smear level is equal to or greater than the threshold value ("YES" at step 45), the mechanical-shutter mode is turned on (step 49). Even in a case where the mechanical shutter 11 is used, exposure starts based upon the electronic shutter (exposure starts in response to application of a field-shift pulse to the CCD 12). The reason for this is that exposure-start timing is comparatively accurate. It goes without saying that exposure-start timing also may be decided by the mechanical shutter 11. When exposure time determined by the decided shutter speed elapses, the mechanical shutter 11 is closed and exposure ends (step 51).

With the mechanical shutter 11 in the closed state, smear charge that has accumulated in the CCD 12 is swept out (step 52). When sweep-out of the smear charge ends, the accumulated signal charge is output as a video signal (step 53). The recording of the obtained image data on the memory card 18 is performed in a manner similar to that when the mechanical-shutter mode is turned off.

The smear level is calculated based upon the photometric value obtained by preliminary photometry. However, whether the mechanical-shutter mode is to be established or not may be decided based upon the shutter speed and f-stop, which have been decided in the manner described above, without calculating the smear level.

As many apparently widely different embodiments of the present invention can be made without departing from the spirit and scope thereof, it is to be understood that the invention is not limited to the specific embodiments thereof except as defined in the appended claims.

What is claimed is:

1. An image sensing apparatus having a solid-state image sensing device for storing signal charge conforming to amount of received light with which a photoreceptor surface is irradiated, reading out the signal charge stored and outputting a video signal, comprising:
    a drive device for controlling read-out of signal charge, which has been stored in the solid-state image sensing device, and sweep-out of unnecessary signal charge;
    a mechanical shutter for limiting irradiation time during which the photoreceptor surface of the solid-state image sensing device is irradiated with light;
    a decision device for deciding whether to perform a mechanical shutter operation by said mechanical shutter or an electronic shutter operation by said drive unit based upon amount of smear signal charge that has been stored in the solid-state image sensing device; and
    a shutter control device for controlling at least one of said drive device and mechanical shutter, in accordance with the decision rendered by said decision device, so as to perform at least one of the electronic shutter operation and mechanical shutter operation.

* * * * *